United States Patent
Yang et al.

(10) Patent No.: US 7,636,799 B2
(45) Date of Patent: Dec. 22, 2009

(54) METHODS OF AUTORUN USING SEMICONDUCTOR STORAGE DEVICES

(75) Inventors: Longhe Yang, Guangdong Province (CN); Zhiyuan Zhong, Guangdong Province (CN)

(73) Assignee: NETAC Technology Co., Ltd., Shenzhen, Guangdong Province (CN)

( * ) Notice: Subject to any disclaimer, the term of this patent is extended or adjusted under 35 U.S.C. 154(b) by 333 days.

(21) Appl. No.: 10/565,384

(22) PCT Filed: Jul. 22, 2004

(86) PCT No.: PCT/CN2004/000847

§ 371 (c)(1),
(2), (4) Date: Jan. 23, 2006

(87) PCT Pub. No.: WO2005/008504

PCT Pub. Date: Jan. 27, 2005

(65) Prior Publication Data

US 2007/0106823 A1 May 10, 2007

(30) Foreign Application Priority Data

Jul. 22, 2003 (CN) .................................. 03 146090

(51) Int. Cl.
*G06F 3/00* (2006.01)
*G06F 13/12* (2006.01)
*G06F 13/38* (2006.01)

(52) U.S. Cl. .............................. 710/15; 710/19; 710/58; 710/62

(58) Field of Classification Search .................... 710/15, 710/19, 58, 62
See application file for complete search history.

(56) References Cited

U.S. PATENT DOCUMENTS

| 5,721,952 | A | | 2/1998 | Lin et al. ........................ 710/19 |
| 5,954,805 | A | * | 9/1999 | Brusky et al. .................. 710/36 |
| 6,117,186 | A | | 9/2000 | Wydall et al. |
| 2002/0078367 | A1 | | 6/2002 | Lang et al. |
| 2003/0046447 | A1 | * | 3/2003 | Kouperchliak et al. ....... 709/321 |
| 2005/0083741 | A1 | * | 4/2005 | Chang et al. .................. 365/200 |
| 2006/0279642 | A1 | * | 12/2006 | Yoneda ...................... 348/231.1 |
| 2006/0282571 | A1 | * | 12/2006 | Choi et al. ..................... 710/62 |

FOREIGN PATENT DOCUMENTS

| CN | 1282007 | 1/2001 |
| CN | 01114883.7 | 6/2001 |
| CN | 2522936 | 1/2002 |
| EP | 1072976 A2 | 1/2001 |

(Continued)

OTHER PUBLICATIONS

European Search Report (of- PCT/CN2004000847) dated Sep. 26, 2008.

*Primary Examiner*—Henry W. H. Tsai
*Assistant Examiner*—Tushar S Shah
(74) *Attorney, Agent, or Firm*—Ping Wang; Morris, Manning & Martin, LLP

(57) ABSTRACT

The present invention provides a method for automatically executing files in a semiconductor storage device. In this method, a specific file in the semiconductor storage device coupled to a host computer is automatically executed by activating the AutoRun mechanism of the operation system. The storage function of the semiconductor storage device is combined with the AutoRun function of files of the operation system according to the present invention. The method is applicable to various operation systems, and broadens the application function of the semiconductor storage device.

21 Claims, 5 Drawing Sheets

FOREIGN PATENT DOCUMENTS

| | | |
|---|---|---|
| EP | 1271332 A2 | 1/2002 |
| JP | 2004342068 A * | 12/2004 |
| WO | 0029945 A1 | 5/2000 |
| WO | 02093468 A1 | 11/2002 |

* cited by examiner

METHODS OF AUTORUN USING SEMICONDUCTOR STORAGE DEVICES

FIELD OF THE INVENTION

This invention relates to data storage field, and more particularly, to a method of AutoRun using a semiconductor storage device, in which a conventional storage function of the semiconductor storage device can be performed in the process of AutoRun or after then.

BACKGROUND OF THE INVENTION

Most of the conventional operation systems have an Auto-Run mechanism. However, they only support an AutoRun function of a specific file in an optical disk or a host disk. For example, while an optical disk is inserted into an optical disk drive of a host computer, WINDOWS 98 (an operation system developed by Microsoft) sends an inquiry command to the disk coupled thereto so as to obtain a status thereof based on a related protocol (such as MMC3, and SCSI), thereby identifying and configuring the disk based on the obtained status. The operation system will further inquire the disk whether the optical disk is inserted into the drive when the identification and configuration of the disk is completed. If the answer is yes, the operation system will read out files stored in the optical disk. If there is an AutoRun configuration file in the root directory of the optical disk, the operation system will, first of all, process the AutoRun configuration file to find out a specific file according to the related protocol under which the AutoRun configuration file follows, and then execute the specific file. In the process of executing the specific file, the operation system can also read data from the optical disk.

The AutoRun configuration file has a uniform file name, "autorun.inf", in most operation systems. The name and icon of the specific file to be executed are saved in the AutoRun configuration file. The operation system can find out and execute the specific file by means of the above information.

With the rapid evolution of the computer technology, semiconductor storage devices have become more and more popular due to the unique characters thereof. However, until now, no methods have been disclosed to activate the AutoRun mechanism of an operation system in a host computer by using semiconductor storage devices so that a specific file can be automatically executed.

SUMMARY OF THE INVENTION

The present invention addresses the deficiencies in the prior art by providing a method for activating an AutoRun mechanism of an operation system by using a semiconductor storage device, which enables a specific file stored in the semiconductor storage device to be executed automatically. With this method, when a semiconductor storage device is coupled to a host computer, a specific file stored in the device can be executed automatically, and the device can function as a conventional storage device regardless of the execution of AutoRun.

In order to achieve the above object, the present invention provides a method of AutoRun using a semiconductor storage device, which is coupled to a host computer having an operation system with an AutoRun mechanism, the method comprising:

1) the operation system of the host computer sending out an inquiry command to the semiconductor storage device for detecting the type of the device;

2) the semiconductor storage device replying to the inquiry command from the operation system based on one or more predetermined device types;

3) the operation system of the host computer deeming the semiconductor storage device as one of the predetermined device types according to the reply from the semiconductor storage device, and performing an operation accordingly; and 4) the AutoRun mechanism of the operation system searching for an AutoRun configuration file stored in the semiconductor storage device which simulates the deemed device type so that a specific file directed by the searched AutoRun configuration file can be executed by the operation system.

In the above method, the semiconductor storage device is coupled to the host computer through one selected from, but not limited to, the group consisting of a USB interface, a UWB interface, a blue-tooth interface, an IrDA infrared interface, a HomeRF interface, an IEEE 802.11a interface, an IEEE 802.11b interface, an IEEE 1394 Bus, an IDE Bus, a USB Bus, an LAN, and/or a WAN.

In this method, the predetermined device type, which is supported by the AutoRun mechanism of the operation system of the host computer, includes but not limited to, an optical disk drive, a host disk, a removable disk, a USB large volume disk, and/or a USB flash disk. The optical disk includes, but not limited to, a CD-ROM, a CD-RW, a DVD-ROM, a DVD-RW, a DVD-RAM, a blue laser DVD, and/or a red laser DVD. The process for performing an operation in Step 3) includes installing driver programs on the device and configuring the device.

In the method of AutoRun using a semiconductor storage device coupled to the host computer of the present invention, the deemed type of the semiconductor storage device can be changed by inputting an indication of a command, buttoning, or programming; the semiconductor storage device is then preset as a preset type selected from the predetermined types according to the input indication; and after the semiconductor storage device is reset, the semiconductor storage device is coupled to the host computer as the preset type of the device.

In the method of AutoRun using a semiconductor storage device of the present invention, the predetermined device types can be defined as one or more device types based on related protocols; and the semiconductor storage device can be coupled to the host computer as one device, or as multiple devices which are processed according to the corresponding device types, respectively.

When coupled to the host computer, the semiconductor storage device detects whether the AutoRun configuration file is present in the storage space of the semiconductor storage device; if the AutoRun configuration file is present, the semiconductor storage device is coupled to the host computer as a preset type; if the AutoRun configuration file is not present, the semiconductor storage device is coupled to the host computer as a conventional storage device. Moreover, the host computer can perform a conventional storage operation on the semiconductor storage device according to a user command. The semiconductor storage device can perform the conventional storage operation according to a user command after the AutoRun mechanism of the operation system is activated, regardless of the execution of the specific file.

In the method of the present invention, the conventional device type means an inherent type of the semiconductor storage device, and the conventional storage operation is a process based on a corresponding protocol according to the conventional device type of the semiconductor storage device, and the protocol includes but not limited to UFI, SFF8020I, SCSI Transparent Command Set, Reduced Block Commands (RBC), T10 Project1240-D, ZIP disk and/or MO disk protocols. In particular, the operation for a read-only optical disk is reading; the operation for an erasable optical disk is reading and writing; and the operation for an erasable magnetic memory is reading, writing, formatting, etc.

In order to achieve the object, the present invention provides a method of AutoRun using a semiconductor storage device coupled with a host computer, which has an operation system with an AutoRun mechanism, the method comprising:

1) the operation system of the host computer sending out an inquiry command to the semiconductor storage device for detecting the type of the device;

2) the semiconductor storage device replying to the inquiry command from the operation system that the device is an optical disk drive;

3) the operation system of the host computer deeming the semiconductor storage device as an optical disk based on the reply from the semiconductor storage device, and performing an operation accordingly; and 4) the AutoRun mechanism of the operation system searching for a AutoRun configuration file stored in the semiconductor storage device which simulates an optical disk drive so that a specific file directed by the AutoRun configuration file can be executed.

In the above method, the step 4) comprises:

4-1) the operation system sending out an inquiry command to confirm whether an optical disk is inserted into the optical disk drive when the semiconductor storage device is deemed to be an optical disk drive;

4-2) in response to the inquiry command, the semiconductor storage device, which simulates an optical disk drive, replying to the operation system after a predetermined delay, that an optical disk is already inserted into the optical disk drive so that the operation system deems the semiconductor storage device to be an optical disk with an optical disk; and 4-3) the AutoRun mechanism of the operation system searching for the AutoRun configuration file stored in the semiconductor storage device which simulates the optical disk drive with an optical disk so that the operation system can execute a specific file directed by the AutoRun configuration file.

In one aspect, an AutoRun program is preset in the semiconductor storage device coupled to the host computer and capable of directing a specific file; and the AutoRun program is directed by the AutoRun configuration file, the step 4-3) comprising:

4-3-1) the operation system accessing the AutoRun configuration file stored in the semiconductor storage device, and searching for the AutoRun program;

4-3-2) executing the AutoRun program to search for a specific file, and copying the AutoRun program and the specific file to a host disk of the host computer;

4-3-3) the copy of the AutoRun program in the host disk of the host computer calling and executing the copy of the specific file; and 4-3-4) the copy of the AutoRun program sending out a reset command to the semiconductor storage device.

In another aspect, an AutoRun program is preset in the semiconductor storage device coupled to the host computer and capable of directing a specific file; the AutoRun program is directed by the AutoRun configuration file, the step 4-3) comprises:

4-3-1) the operation system accessing the AutoRun configuration file stored in the semiconductor storage device to search for the AutoRun program, and timing;

4-3-2) executing the AutoRun program to search for a specific file, copying the AutoRun program and the specific file to be executed to a host disk of the host computer;

4-3-3) the copy of the AutoRun program in the host disk of the host computer calling and executing the copy of the specific file; and 4-3-4) sending out a reset command to the semiconductor storage device when the timing ends, wherein the timing is set by a user or through a special software and/or program.

The above method further comprises the steps for switching the semiconductor storage device to a conventional storage device after activating the AutoRun mechanism of the operation system in step 4):

5) resetting the semiconductor storage device;

6) replying that the semiconductor storage device is the conventional storage device when the operation system sends out another inquiry command for detecting the type of the device;

7) the operation system of the host computer performing a corresponding configuration based on the reply from the semiconductor storage device; and 8) the operation system performing a conventional storage operation on the semiconductor storage device according to a user command.

In the present invention, the step for switching the semiconductor storage device to a conventional storage device can be performed after activating the AutoRun mechanism of the operation system of the host computer, regardless of the execution of the specific file. The AutoRun mechanism of the operation system of the host computer supports an automatic execution of a file in the optical disk in the optical disk drive, and the optical disk drive includes but not limited to a CD-ROM, a CD-RW, a DVD-ROM, a DVD-RW, a DVD-RAM, a blue laser DVD, and/or a red laser DVD. Moreover, a device type of the semiconductor storage device can be changed by inputting any indication of a command, buttoning, or programming; the semiconductor storage device is then preset as a preset type selected from the predetermined types according to the input indication, and after the semiconductor storage device is reset, the semiconductor storage device can be coupled to the host computer as the preset type of device. When coupled to the host computer, the semiconductor storage device detects whether the AutoRun configuration file is present in the storage space of the semiconductor storage device; if the AutoRun configuration file is present, the semiconductor storage device is coupled to the host computer as a preset type; if the AutoRun configuration file is not present, the semiconductor storage device is coupled to the host computer as a conventional storage device. Moreover, the host computer can perform a conventional storage operation on the semiconductor storage device according to a user command.

According to the present invention, no matter whether the operation system of the host computer supports the automatic execution of files in the optical disk, or the automatic execution of files in the host disk, it is possible to activate the AutoRun mechanism of the operation system using a semiconductor storage device, so as to automatically execute the AutoRun configuration file in the semiconductor storage device. In the meantime, the semiconductor storage device can provide the conventional storage function.

DETAILED DESCRIPTION OF THE INVENTION

The conventional operation systems can be classified into two kinds, in accordance with the type of devices being supported by the AutoRun mechanism of the operation systems. One including WINDOWS 9X and WINDOWS XP supports an automatic execution of a specific file in an optical disk only. Another including WINDOWS 2000 and WINDOWS ME supports not only an automatic execution in an optical disk but also an automatic execution of a specific file in a host disk.

According to the present invention, when a semiconductor storage device is coupled to a host computer having the first kind of operation system mentioned above, the semiconductor storage device may simulate an optical disk drive having an optical disk so as to activate the AutoRun mechanism of the operation system. For the second kind of operation system, the semiconductor storage device may simulate an optical disk drive having an optical disk to activate the AutoRun mechanism of the operation system, like the first kind of operation system. The semiconductor storage device can also simulate a host disk to activate the AutoRun mechanism of the operation system. After the activation of the AutoRun mechanism is completed, the semiconductor storage device can be automatically read out, and the host disk can be processed conventionally, such as reading/writing data. Namely, a conventional function of storage information of the semiconductor storage device could be normally performed.

Chinese Patent Application No. 01114883.7 discloses a method for simulating a semiconductor storage device to be various kinds of storage devices such as an optical disk, a floppy, or a host disk, which is incorporated herein by reference in its entity.

A first embodiment of the invention is described as follows in conjunction with FIG. 1. According to this embodiment, the semiconductor storage device is coupled to a host computer with the second kind of operation system such as WINDOWS 2000 and WINDOWS ME, that is, the operation system of the embodiment supports the automatic execution both in an optical disk and a host disk.

Corresponding to the operation system of the host computer, the semiconductor storage device of the first embodiment simulates a host disk to automatically execute a specific file. FIG. 1 is a flowchart of this embodiment.

Figure 1:
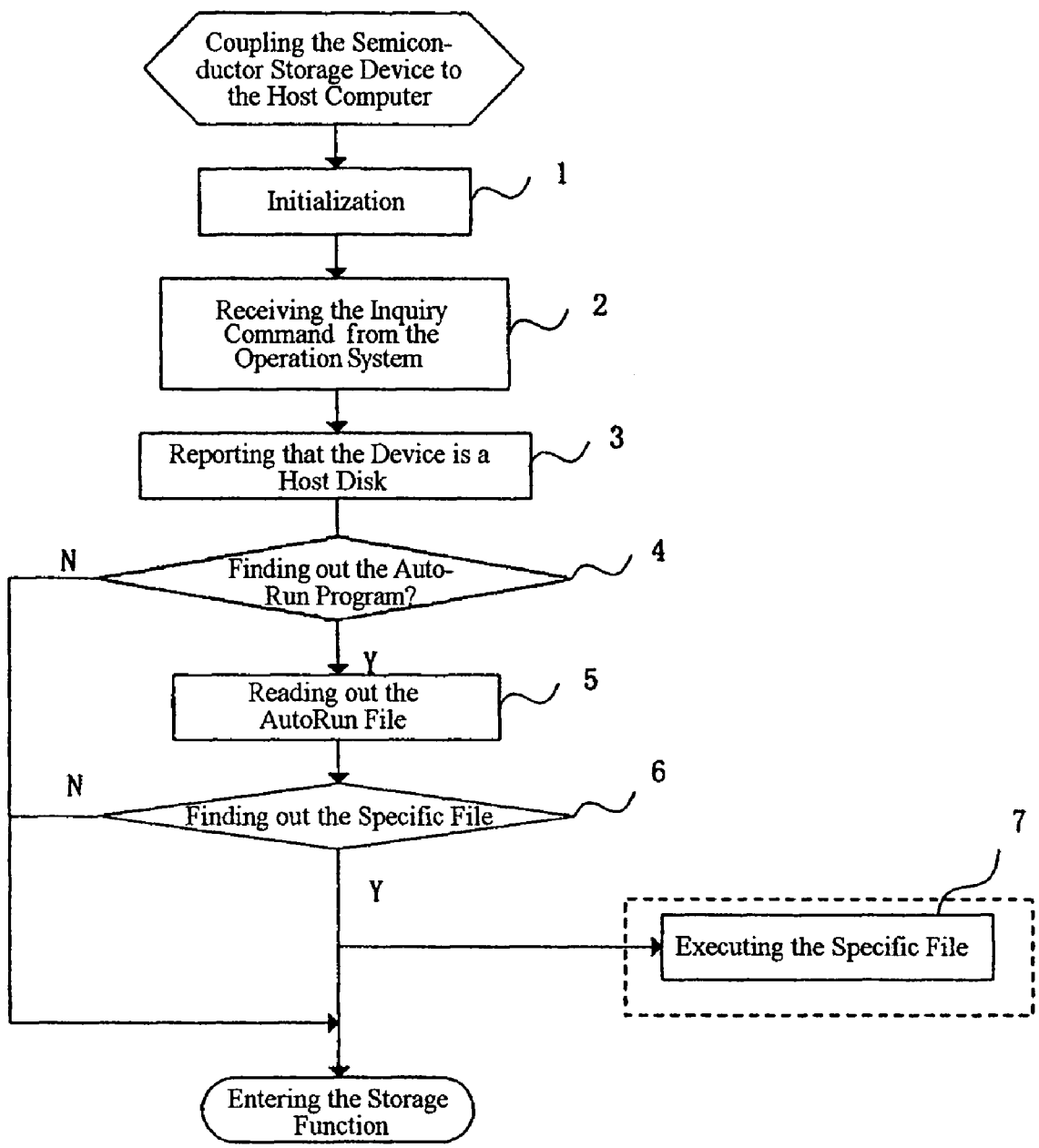
FIG. 1 a flowchart showing that a semiconductor storage device simulates a host disk, according to a first embodiment of the present invention.

Referring to FIG. 1, the semiconductor storage device is coupled to the host computer and is initiated (step 1). It is understood that the initialization of the semiconductor storage device is a conventional method and will not be described in detail. The operation system sends out an inquiry command to the newly coupled semiconductor storage device to detect a type of the device. The semiconductor storage device replies to the inquiry based on a preset device type value (step 2) after receiving the inquiry command. It is understood by those skilled in the art that the reply to the inquiry from the newly coupled device will determine how the device is to be recognized, configured, and thereby processed by the operation system, such as determining whether the AutoRun mechanism is to be activated by the operation system and how the AutoRun is performing. For example, if the reply indicates that the newly coupled device is a removable floppy disk, the operation system thereby does not execute an AutoRun procedure. And, if the reply indicates that the newly coupled device is an optical disk drive or a host disk, the AutoRun mechanism of the operation system can be activated so as to automatically execute a specific file if it exists.

In this embodiment, the newly coupled semiconductor storage device is preset to simulate a virtual host disk. The reply from the device received by the operation system indicates that the coupled device is a host disk (step 3). Accordingly, the operation system treats the semiconductor storage device as a host disk, and then searches for a specific AutoRun configuration file on a storage space of the semiconductor storage device corresponding to a preset AutoRun mechanism (step 4). If the AutoRun configuration file is not present, the operation system stops the AutoRun procedure and begins to perform a conventional storage function. If, on the other hand, the AutoRun configuration file is found out, the operation system thereby reads out information of the file (step 5), and identifies a specific file to be executed (hereinafter referred to as "specific file") located in a specific path by using the information. Moreover, if the specific file is not present, the operation system stops the AutoRun procedure and begins to perform the conventional storage function. If, on the other hand, the specific file is found out (step 6), the operation system thereby begins to execute the specific file (step 7) and starts up the conventional storage function of the semiconductor storage device. The activation of AutoRun ends.

According to FIG. 1, step 7 shows that the operation system controls the execution of the specific file and a process of the execution is controlled by the operation system, too. According to the present invention, after activating the automatic execution of the specific file in the semiconductor storage device, the device turns to the conventional storage function regardless of the automatic execution of the specific file. For example, different specific files may lead to different performance time, result, or even different type of close of the file. If the specific file is a text file, the execution can only be terminated by a user operation. Alternatively, if the specific file is an executable file, the executing can be automatically terminated at the end of the execution. That is, once the automatic execution of the specific file is activated, the activation procedure of the AutoRun mechanism is completed and the semiconductor storage device turns to the conventional storage function. Therefore, step 7 is shown with a dashed line.

According to the present invention, the location of the specific file is not limited to the coupled semiconductor storage device. The operation system allows the specific file to be located either in an absolute path or in a relative path as long as the specific file can be found out. The specific file may be stored in a host disk, an optical disk, and any other removable disks of the host computer, or even stored in a network communicated with the host computer. If the storage medium containing the specific file is moved or changed during the execution of the file, the specific file fails to be accessed and the execution procedure will cease, and the semiconductor storage device turns to the conventional storage function.

As stated above, the first kind of operation systems including WINDOWS 9X and WINDOWS XP do not support the automatic execution of the file in a host disk. Therefore, when coupled to the host computer, the semiconductor storage device should be configured to simulate an optical disk drive containing an optical disk so as to activate the AutoRun mechanism of such operation systems.

Figure 2:
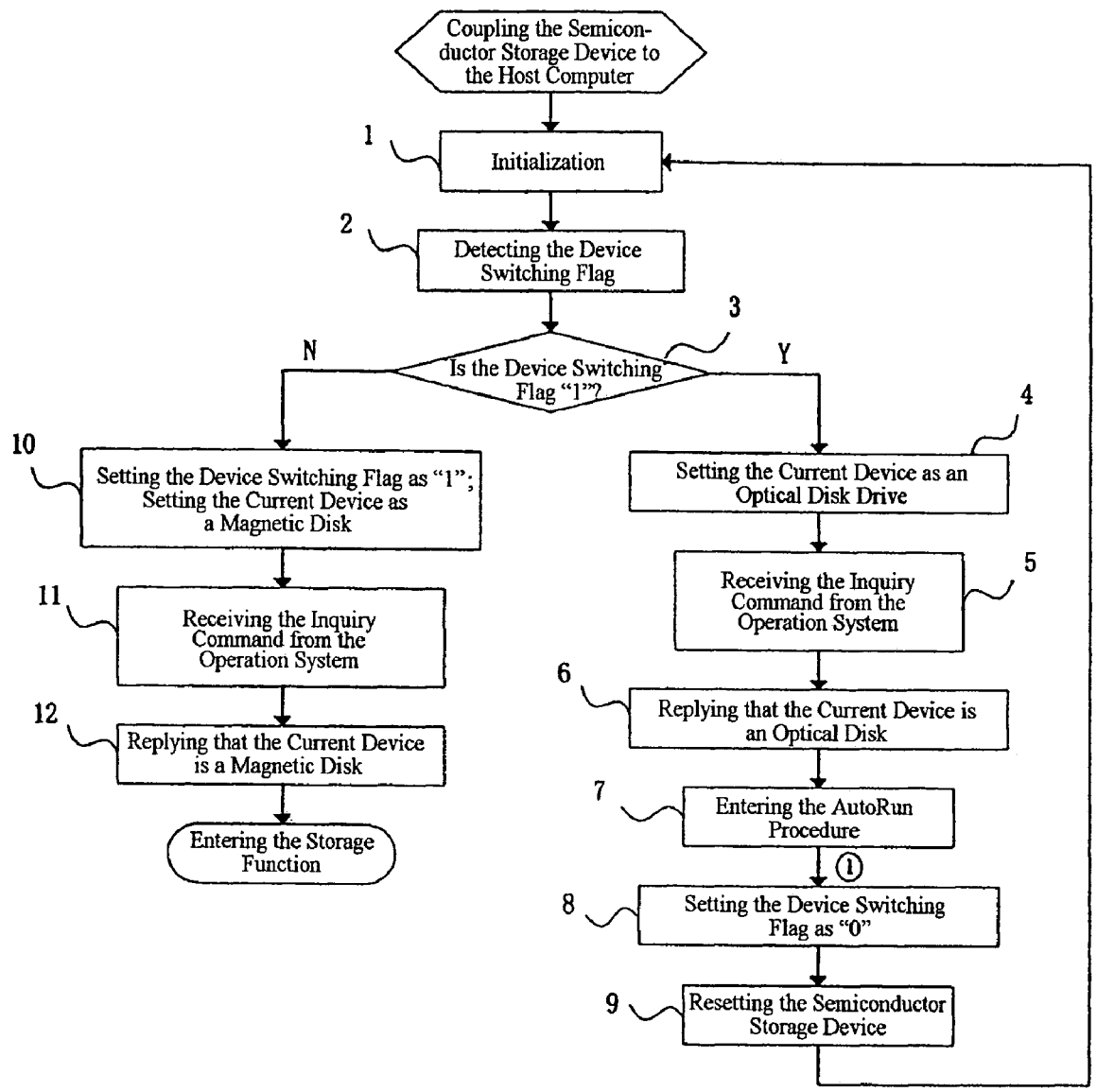
FIG. 2 a flowchart showing the switch of the semiconductor storage device between AutoRun and conventional storage functions on condition that the semiconductor storage device simulates an optical disk drive, according to a second embodiment of the present invention.

Moreover, a conventional AutoRun mechanism in an operation system will not switch to storage function at the end of the automatic execution, for that an optical disk is always considered as a non-rewritable medium. However, the semiconductor storage device of the present invention is able to implement the conventional storage function after the automatic execution, even though the semiconductor storage device is used to simulate an optical disk drive to activate the AutoRun mechanism of the operation system. That is, the method of AutoRun using a semiconductor storage device requires a switch between an AutoRun function and the conventional storage function of the semiconductor storage device so as to combine these functions together. FIG. 2 is a flowchart of a second embodiment of the present invention. Referring to FIG. 2, when coupled to a host computer with the first kind of operation system, the semiconductor storage device is configured to simulate an optical disk drive to activate the AutoRun mechanism of the operation system, and then switches to the conventional storage function.

As shown in FIG. 2, when the semiconductor storage device is coupled to the host computer, an initialization is carried out (step 1) and a device switching flag is detected (step 2). The device switching flag, which is used to indicate a switch of device types, is stored in the storage space of the semiconductor storage device. According to the present embodiment, the device switching flag is set as a first predetermined value, such as "1", at the beginning. If the device switching flag is detected to be "1" (step 3), step 4 is performed to configure a current device type flag to be an optical disk drive. The current device type flag stored in the semiconductor storage device is used to indicate the type of the device, and is configured to reply to the inquiry command from the operation system. In accordance with the current device type flag, the operation system can recognize the device coupled to the host computer, and then install and configure the device. When receiving the inquiry command from the operation system (step 5), the semiconductor storage device replies to the operation system (step 6) that the current device type flag is an optical disk drive as configured at step 4. After receiving the reply, the operation system treats the semiconductor storage device as an optical disk drive without an optical disk. After that, the semiconductor storage device simulates an optical disk drive, and the operation system will perform the automatic execution of the virtual optical disk drive (step 7). The AutoRun procedure is described as follows in conjunction with FIG. 3.

Moreover, a microprocessor within the semiconductor storage device switches the device switching flag to be a second predetermined value, such as "0", different from the first predetermined one (step 8), and then sends out a restart (reset) command to reset the semiconductor storage device (step 9). The reset of the semiconductor storage device can be deemed that the device is re-coupled to the host computer. Therefore, the procedure goes back to the initiation step (step 1). After the initiation of the device, the device switching flag is detected to be "0" at step 2, thereby the procedure goes to step 10. At step 10, on the one hand, the microprocessor within the semiconductor storage device re-switches the device switching flag to be the first predetermined value such as "1", so that the semiconductor storage device can be used to activate the AutoRun mechanism of the operation system next time. On the other hand, the current device type flag is reset from an optical disk drive to a host disk, so that the semiconductor storage device can turn to the conventional storage function. As shown in FIG. 2, when receiving the inquiry command from the operation system to the newly coupled device (step 11), the reply of the semiconductor storage device indicates a host disk based on the current device type flag. In this way, the operation system will not activate the AutoRun mechanism, but directly turn to the conventional storage function to realize the switch of the device type.

According to the present embodiment, the semiconductor storage device realizes the switch between the optical disk drive type and the disk type when the semiconductor storage device is coupled to the host computer by configuring the current device type flag and the device switching flag, so as to realize the switch from the activation of the AutoRun mechanism to the conventional storage function.

The device switching flag is used to fulfill a guiding function during the device switching process, in which a different value of the device switching flag means to perform different procedures. Moreover, the first and the second predetermined values of the device switching flag may be any two values such as a pair of characters, a pair of numbers, or a character and a number, only if the device switching process can choose a procedure to be performed corresponding to the values of the device switching flag. For example, the two values may be "1" and "0", or "optical disk drive" and "removable disk".

The above-mentioned second kind of operation systems including WINDOWS 2000 and WINDOWS ME, which support the automatic execution both in a host disk and in an optical disk drive, may also employ the AutoRun procedure and the device type switching procedure of the present embodiment. The second kind of operation systems cannot provide the storage function for an optical disk drive as well. Therefore, if the semiconductor storage device simulates an optical disk drive in the second kind of operation systems, it is also necessary to employ the abovementioned switching procedure to realize the switch from the AutoRun mechanism to the conventional storage function.

Figure 3:
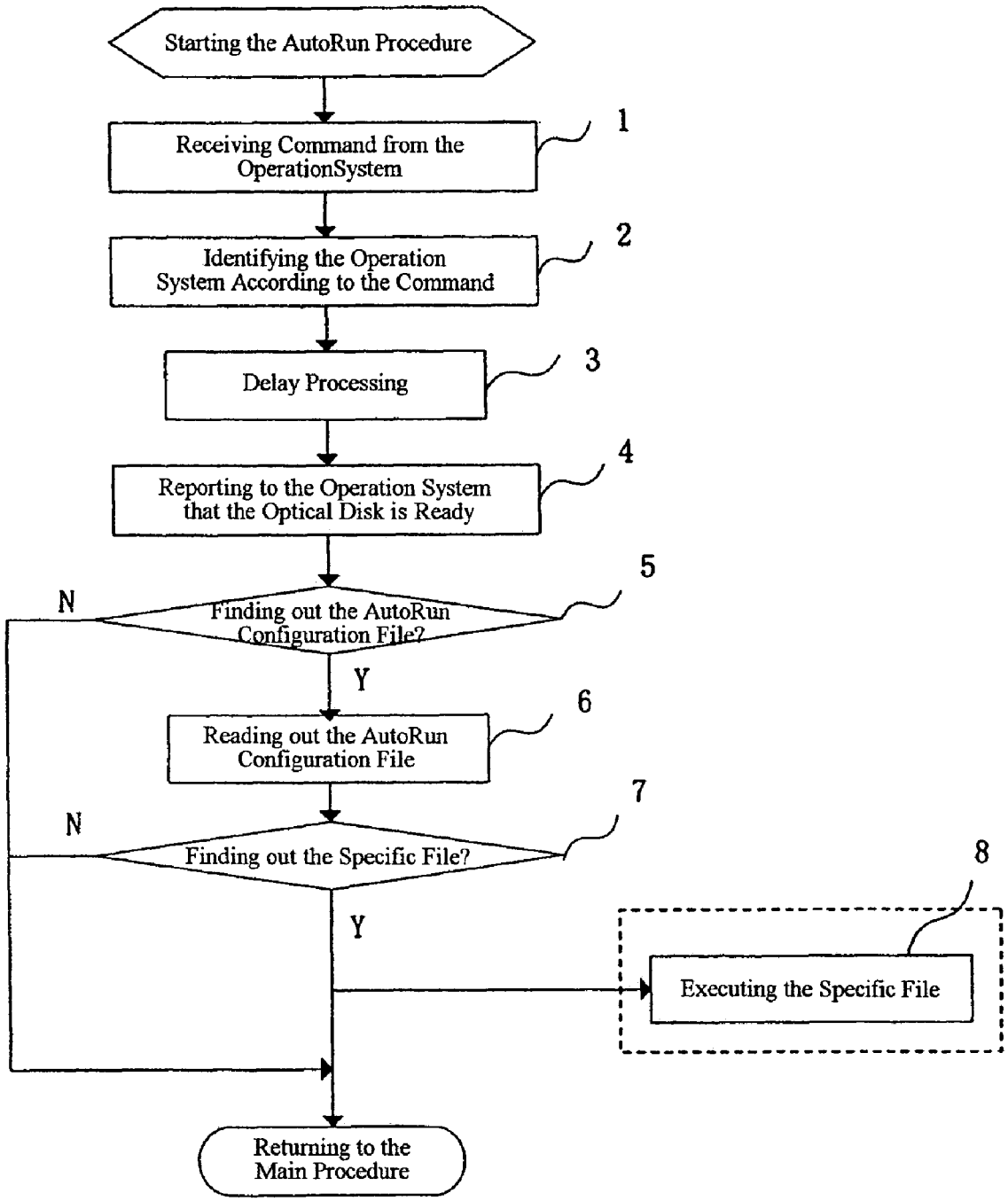
FIG. 3 is a flowchart showing detailed procedures of the step 7 in FIG. 2, in which the AutoRun is illustrated on condition that the semiconductor storage device simulates an optical disk drive.

According to the above procedures, the semiconductor storage device simulates an optical disk drive when proceeding steps 1-6. However, the operation system will not perform the AutoRun procedure when the semiconductor is deemed to be an optical disk drive without an optical disk. Thus, a further activation procedure is performed (step 7). FIG. 3 is a flowchart showing the activation procedure of the AutoRun mechanism of the operation system when the semiconductor storage device simulates an optical disk drive with an optical disk. According to the present invention, the above switch between the AutoRun function and the conventional storage function is referred to as a main procedure (as shown in FIG. 2), while the present AutoRun procedure is a branch of the main procedure.

When determining that an optical disk drive is coupled, the operation system sends out an inquiry command to the drive to check whether an optical disk is inserted (step 1). According to the inquiry command, the drive can further determine the kind of the operation system (step 2). For example, if the inquiry command is READ CAPACITY, the operation system is WINDOWS 2000 or WINDOWS XP; and if the inquiry command is MODE SENSE, the operation system is WINDOWS 9X or WINDOWS ME. It is understood by those skilled in the art that the reply to the inquiry command is different according to the kind of operation system. In order to simulate an action to insert an optical disk into an optical disk drive so that the operation system can read out a file stored in the semiconductor storage device, a delay is required (step 3). After the delay, the reply is changed to "optical disk is inserted" (step 4) in response to the inquiry command from the operation system. Therefore, the operation system can read data stored in the semiconductor storage device and search for the AutoRun configuration file corresponding to the AutoRun mechanism. If the AutoRun configuration file cannot be found out in the semiconductor storage device (step 5), the operation system automatically stops the AutoRun procedure. If the AutoRun configuration file is present in the semiconductor storage device, the operation system reads out information stored in the AutoRun configuration file, and further searches for a specific file directed by the information (step 6). If the specific file corresponding to the information cannot be found out (step 7), the AutoRun procedure stops. If the specific file is present, the operation system will access and execute the specific file (step 8), and simultaneously exit the AutoRun procedure.

During the above AutoRun procedure, the execution of the specific file is independent from the device switching procedure. The specific file may be automatically terminated by itself after the execution, or terminated by a user operation. And, the time of executing the specific file is not fixed. If the device switching procedure happens before the end of the execution of the specific file in the semiconductor storage device, the semiconductor storage device will be reset (restarted) and reconfigured, which may further lead to a sudden break of the execution or even a blue-screen phenomenon. In order to avoid such a phenomenon, it is recommend copying those files involved in the AutoRun procedure to the host disk of the host computer, and executing the copy of the specific file stored in the host disk. In this way, the reset of the semiconductor storage device will not affect the execution of the copy of the specific file. From this point of view, a modified AutoRun procedure is provided in a third embodiment as shown in FIG. 4.

In order to ensure the normal execution of the specific file, an executable program (collectively called "AutoRun program" hereinafter) is preset in the semiconductor storage device. When the operation system accesses the AutoRun configuration file in the semiconductor storage device, the AutoRun program performs the following steps automatically: finding out the specific file to be executed via a predetermined path; copying the specific file to the local host disk; sending out a reset command to reset the semiconductor storage device; and returning to the main procedure as well as other fault toleration processes. Moreover, the AutoRun program also copies itself and the specific file to the host disk, and calls and executes the copy of the specific file. As the copy of the specific file is executed, the AutoRun program sends out the reset command to the semiconductor storage device so that the specific file is directed by the AutoRun program, and the AutoRun program is directed by the AutoRun configuration file.

The AutoRun program can search for the specific file via a predetermined path by means of a predefined configuration file which includes relevant information of the specific file, such as the path, file name, and file type. After finding out the configuration file, the AutoRun program reads the configuration file and finds out the specific file by means of the information provided by the configuration file. Optionally, the AutoRun program can also find out the specific file by means of the information provided by the AutoRun program itself. For example, the Auto Run program can store the information, such as the path, file name, and file type, of the specific file in light of the process that a user directs a specific file. The AutoRun program may find out the specific file directly by means of the above information.

Figure 4:
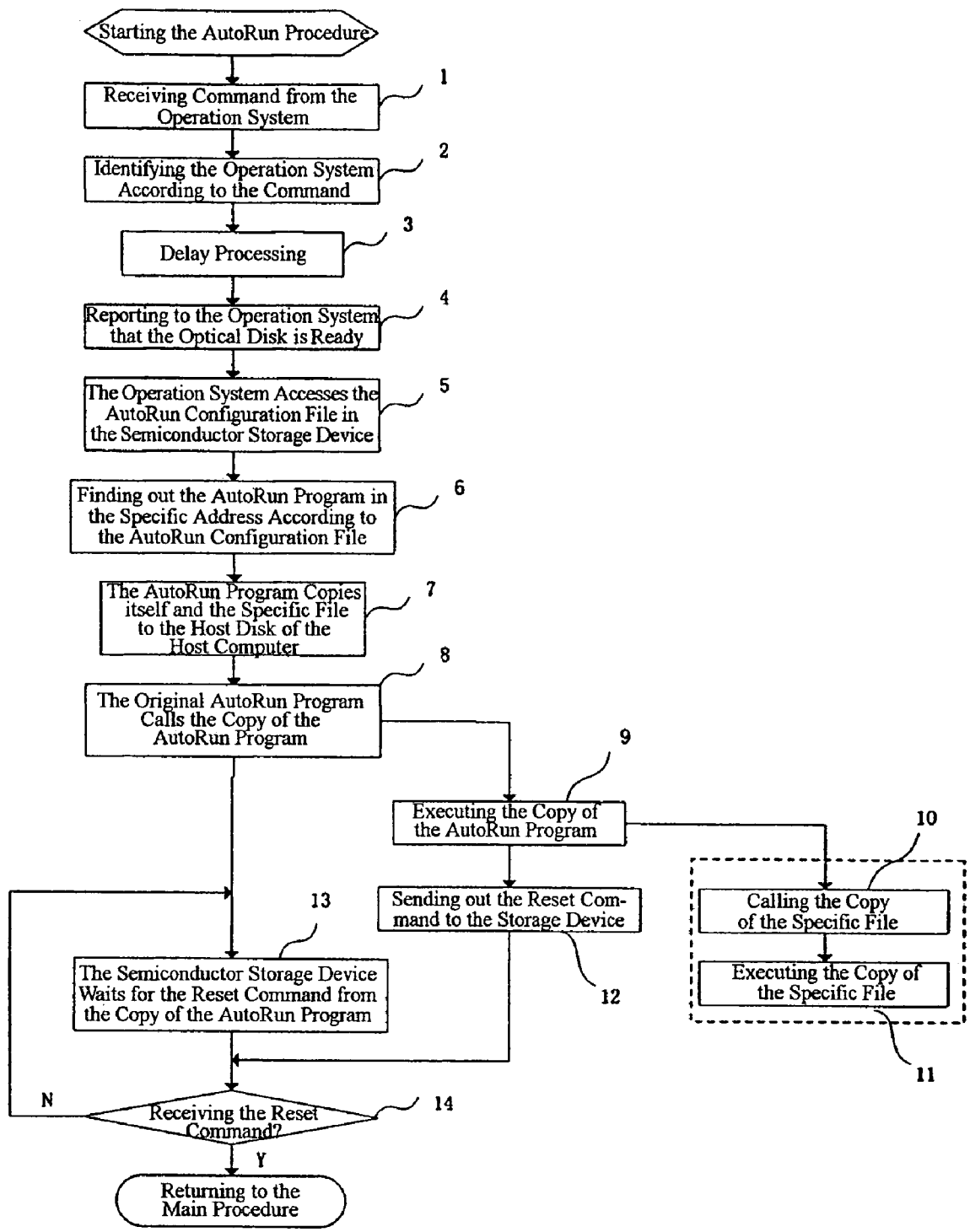
FIG. 4 shows a third embodiment of the present invention, in which an automatic process of copying files is incorporated into the method of the first and second embodiments.

As shown in FIG. 4, the first four steps of the modified AutoRun process are the same as those of the preceding embodiments, namely, the AutoRun program detects the type of the operation system in light of the inquiry command from the operation system and generates a delay. At step 5, the operation system accesses the AutoRun configuration file in the semiconductor storage device. At step 6, the operation system finds out the AutoRun program according to the information, such as a specific address and file name, of the AutoRun configuration file, and then executes the AutoRun program according to the AutoRun mechanism of the operation system. Furthermore, the AutoRun program finds out the specific file according to the specific address, and copies itself and the found specific files to the host disk (at step 7). Therefore, there are two identical files: one is the original AutoRun program and the specific file in the semiconductor storage device, and the other is the copy of the AutoRun program and specific file stored in the host disk.

The original AutoRun program calls the copy of the AutoRun program on the host disk (step 8). When the copy of the AutoRun program runs (step 9), the execution of the original one stops. The semiconductor storage device waits for a reset command from the copy of the AutoRun program (at step 13).

The copy of the AutoRun program calls the copy of the specific file on the host disk (step 10) to execute the copy of the specific file (step 11). If the calling is successful, the copy of the AutoRun program sends out the reset command to the semiconductor storage device (step 12) to instruct the device to switch. After the semiconductor storage device receives the reset command (step 14), it returns to the main procedure. Referring to FIG. 2, the AutoRun program will return to node □ of the procedures shown in FIG. 2. The device type flag is then set as a second predetermined value, such as "0" (step 8) to reset and switch the semiconductor storage device.

As mentioned above, in order to ensure the normal execution of the semiconductor storage device during its switch operation, the actually specific file to be executed is required to be located in an exterior position of the semiconductor storage device, such as in the host disk, other exterior storage devices of the host computer (such as optical disks), or a network coupled to the host computer. If the AutoRun program and/or specific file directed by the AutoRun configuration file are located in the exterior position of the semiconductor storage device, they can be executed directly without the necessity for copying the specific file to the host disk. Accordingly, the execution of the specific file will not be influenced by the switch of the device.

In FIG. 4, steps 10 and 11 are implemented by the specific file controlled by the operation system, so that they are not involved in the AutoRun procedure of the present invention and thereby shown with dashed line.

In the above embodiment, when the calling of the copy of the specific file is successful, the copy of the AutoRun program sends a reset command to the semiconductor storage device. However, for an operation system of the host computer which supports multi-user mechanism, only a user who logs on as a system administrator can enable the AutoRun program to send out the reset command, and other users cannot send the reset command to the semiconductor storage device through the copy of the AutoRun program. This causes a failure of the initiation of the device switching operation.

To overcome the above problem, the present invention provides another embodiment. In this embodiment, the AutoRun program sends a reset command to the semiconductor storage device in a timing trigger manner, which thereby supports the multi-user operation system. In this embodiment, the processes for simulating a virtual optical disk drive and switching to the conventional storage function are also implemented by the main procedure shown in FIG. 2. In this embodiment, the AutoRun procedure (step 7 of FIG. 2) in the main procedure will be described with reference to FIG. 5.

Figure 5:
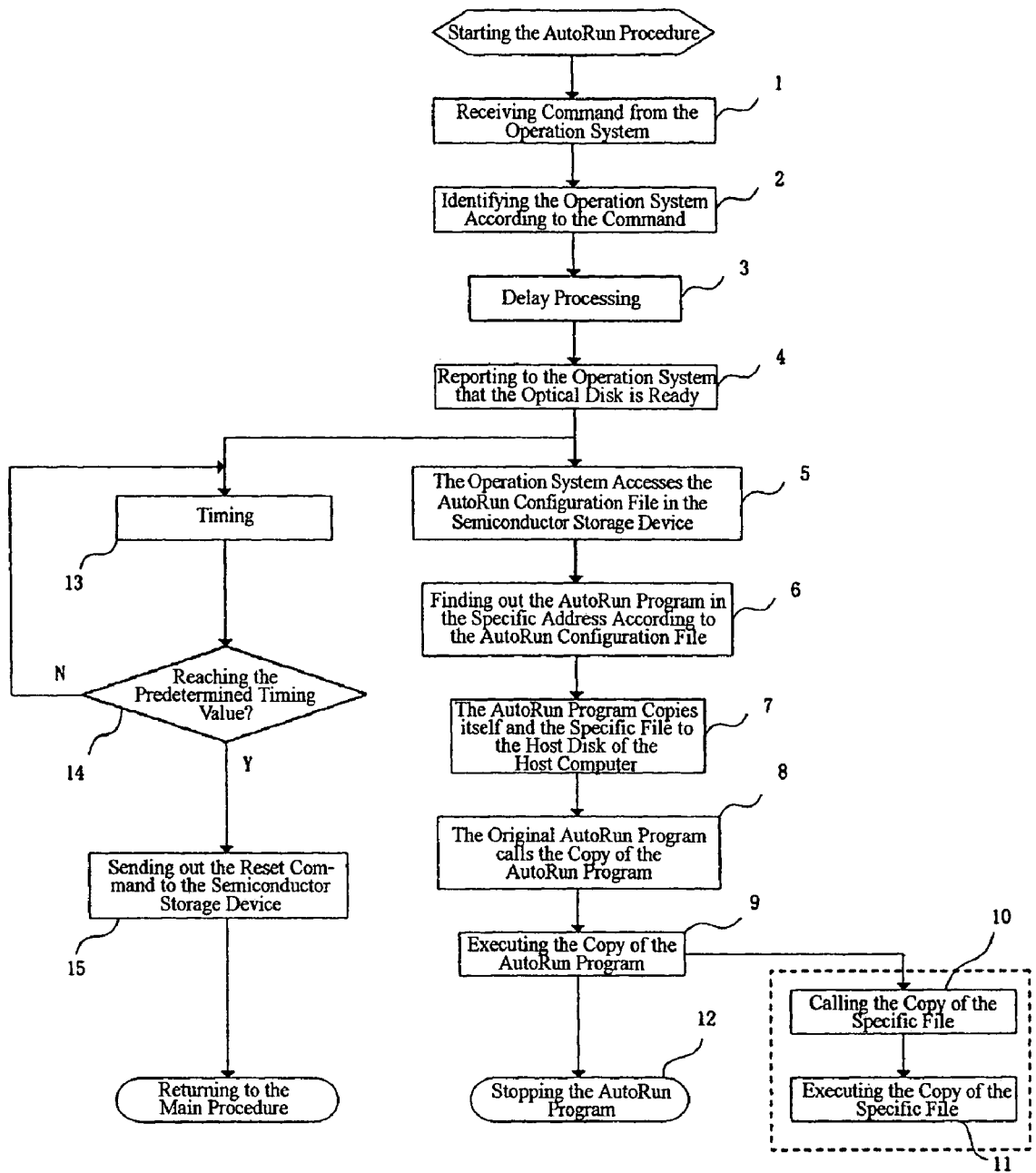
FIG. 5 shows a fourth embodiment of the present invention, in which the method of the third embodiment is modified, so that the occasion for resetting the semiconductor storage device can be controlled by timing.

As shown in FIG. 5, the first four steps of the modified AutoRun procedure are the same to those of the preceding ones, that is, AutoRun program detects the type of the operation system according to the inquiry command of the operation system and generates a delay. At step 5, a timing step is incorporated and will be kept on for a predetermined period, until the time arrives at a predetermined timing value. Steps 6, 7, 8 and 9 are similar with those of the third embodiment, both of which include processes that the operation system finds out the AutoRun program according to the AutoRun configuration file in the semiconductor storage device, and then executes the AutoRun program. Furthermore, the AutoRun program finds out a specific file, and copies itself and the specific file to the host disk. The original AutoRun program calls and executes the copy of the AutoRun program, and then stops the execution of the original AUtoRun program.

At step 10, the copy of the AutoRun program calls the copy of the specific file on the host disk to enable the copy of the specific file to be executed (step 11). If the calling of the specific file is successful, the copy of the AutoRun program stops its execution (step 12).

On the other hand, the timing at step 13 is kept on until the time arrives at a predetermined timing value (step 14). At this time, the timing program sends a reset command to the semiconductor storage device, and the main procedure is initiated.

Referring to FIG. 2, the AutoRun procedure will return to node 0 of the procedure shown in FIG. 2. The device type flag is then set as a second predetermined value, such as "0" (step 8) to reset and switch the semiconductor storage device.

In the above-mentioned method, the predetermined timing value is not less than the time required for performing the process from step 5 to step 11, that is, the total time required from the operation system accessing the AutoRun configuration file to the copy of the specific file being executed, so as to ensure that the reset command is sent out after the copy of the specific file is executed. In general, the predetermined timing value is related to the file size of the specific file and the AutoRun program, as well as to the performance of the host system and semiconductor storage device. The predetermined timing value may be determined by a user, or a special software and/or program.

The method for triggering the reset command through timing of the present embodiment can either be used in conjunction with the method for sending out the reset command by executing program, or be employed alone. For the first instance, if the AutoRun program cannot send out the reset command successfully while the time has reached the predetermined value, the reset command will be sent out by the timing program, which thereby improves stability and reliability of the AutoRun mechanism. In addition, the reset command can be triggered manually through a switch.

In FIG. 5, steps 10 and 11 are not involved in the AutoRun procedure of the present invention and shown with dashed line, since they are implemented by the specific file which is controlled by the operation system.

As mentioned above, in order to ensure the normal execution of the semiconductor storage device during the device switching operation, the actually specific file to be executed is required to be located in the exterior position of the semiconductor storage device, such as in the host disk, other exterior storage devices of the host computer (such as optical disks), or the network coupled to the host computer. If the AutoRun program and/or the specific file directed by the AutoRun configuration file are located in the exterior position of the semiconductor storage device, they can be executed directly without the necessity for copying the specific file to the host disk. Accordingly, the execution of the specific file is not influenced by the switch of the device.

In the most of the above embodiments, the semiconductor storage device coupled to the host computer is deemed and processed as two different types of device. However, according to related protocols, the semiconductor storage device can be deemed as two or more types of device. The host computer or user then processes the data of the two or more types of device accordingly without a switching process.

For example, when the operation system inquires the device, the semiconductor storage device replies that there are two types of device, such as an optical disk drive and a removable disk. The host computer configures and loads driver program in view of the two devices, respectively. In the meantime, two disk icons are created in the operation system of the host computer. In view of the optical disk drive, the semiconductor storage device simulates an optical disk drive with an optical disk. The AutoRun mechanism of the operation system is activated to enable the operation system to execute the specific file automatically, read data from the device, and write or record data according to the device type. And, as to the removable disk, the host computer reads the file system of the semiconductor storage device, operates on the semiconductor storage device, such as reading, writing and formatting data, according to the command from users. The operations of the above two device are independent from each other, without needing any switch operation. The information such as a capacity of each device can be identified by users or programs manually, or by the semiconductor storage device automatically.

As the automatic execution of the files in the semiconductor is implemented by using the method of the present invention, crypto mechanism can be employed, so as to encrypt the memory space or files in the semiconductor storage device. Also, the AutoRun configuration file can be executed for limited times or for limited period of time. For example, if the specific file to be executed by the AutoRun configuration file is a certain software program, the specific file may record a date of the first use. When the use of the software program reaches a predetermined term, the user is indicated to perform a corresponding operation. Otherwise, the software program cannot be applied.

In the present invention, various existing AutoRun configuration file compilation softwares can be used to direct the specific file. The user can direct a specific file by adding some information, such as a specified address, into the AutoRun configuration file, and then saving the AutoRun configuration file in the semiconductor storage device.

Accordingly, the principle of the present invention is that the semiconductor storage device actuates the predetermined AutoRun mechanism of the operation system through replying to the inquiry command from the operation system and the AutoRun mechanism controls the AutoRun configuration file in the semiconductor storage device to implement the automatic execution function of the specific file. In addition to the ordinary storage function, the present invention can provide AutoRun and storage function for files in the semiconductor storage device. The method of the present invention is applicable for various operation systems and semiconductor storage devices. Furthermore, the addresses for saving files participating in the automatic execution process are not restricted, which improves the application of semiconductor storage devices and broadens the scope of application of semiconductor storage devices.

Various modifications to the technical solution of the present invention without departing from the spirit of the invention will fall within the scope as defined in the following claims.

What is claimed is:

1. A method of AutoRun using a semiconductor storage device, the semiconductor storage device being coupled to a host computer having an operation system with an AutoRun mechanism, comprising:
   1) the operation system of the host computer sending out an inquiry command to the semiconductor storage device for detecting a type of the device, wherein the semiconductor storage device includes at least one device;
   2) the semiconductor storage device replying to the inquiry command from the operation system based on one or more predetermined device types;
   3) the operation system of the host computer deeming the semiconductor storage device as one type of the predetermined device types according to the reply from the semiconductor storage device, and performing an operation accordingly; and
   4) the AutoRun mechanism of the operation system searching for an AutoRun configuration file stored in the semiconductor storage device which simulates said deemed device type so that a specific file directed by the searched AutoRun configuration file can be executed by the operation system,
   wherein an AutoRun program is preset in the semiconductor storage device coupled to the host computer for directing the specific file; and the AutoRun program is directed by the AutoRun configuration file, wherein the searching step comprises:
   the operation system accessing the AutoRun configuration file stored in the semiconductor storage device to search for the AutoRun program, and starting a timing program with a predetermined timing value, wherein the predetermined timing value is based on a size of the specific file, the time estimated for executing the AutoRun program, and performance of the semiconductor device;
   executing the AutoRun program to search for the specific file, copying the AutoRun program and the specific file to be executed to a host disk of the host computer;
   the AutoRun program in the semiconductor storage device calling the copy of the AutoRun program in the host disk of the host computer to execute the copy of the specific file in the host disk of the host computer; and
   the timing program sending out a reset command to the semiconductor storage device when elapsed time arrives at the predetermined timing value.

2. The method of claim 1, wherein the semiconductor storage device is coupled to the host computer through an interface selected from the group consisting of a USB interface, a UWB interface, a blue-tooth interface, an IrDA infrared interface, a HomeRF interface, an IEEE 802.11a interface, an IEEE 802.11b interface, an IEEE 1394 Bus, an IDE Bus, a USB Bus, an LAN, and a WAN.

3. The method of claim 1, wherein the predetermined device types, which are supported by the AutoRun mechanism of the operation system of the host computer, are selected from the group consisting of an optical disk drive, a host disk, a removable disk, a USB large volume disk, and a USB flash disk.

4. The method of claim 3, wherein the optical disk is selected from the group consisting of a CD-ROM, a CD-RW, a DVD-ROM, a DVD-RW, a DVD-RAM, a blue laser DVD, and a red laser DVD.

5. The method of claim 1, wherein said deemed type of the semiconductor storage device can be changed by inputting an indication from a command, buttoning, or programming; the semiconductor storage device is then preset as a preset type selected from the predetermined types according to the input indication, and after the semiconductor storage device is reset, the semiconductor storage device is coupled to the host computer as the preset type of device.

6. The method of claim 1, wherein the predetermined device types can be defined as one or more device types based on related protocols; the semiconductor storage device can be coupled to the host computer as one device, or as more devices which are processed according to the device types, respectively.

7. The method of claim 1, wherein the semiconductor storage device detects whether the AutoRun configuration file is present in a storage space of the semiconductor storage device; if the AutoRun configuration file is present, the semiconductor storage device is coupled to the host computer as a preset type; if the AutoRun configuration file is not present, the semiconductor storage device is coupled to the host computer as a conventional storage device.

8. The method of claim 1, wherein the host computer can perform a conventional storage operation on the semiconductor storage device according to a user command.

9. The method of claim 8, wherein the semiconductor storage device can perform the conventional storage operation according to a user command after the AutoRun mechanism of the operation system is activated, regardless of the execution of the specific file.

10. The method of claim 9, wherein the conventional storage operation is a process based on a protocol according to a conventional device type of the semiconductor storage device, and the protocol is selected from the group consisting of UFI, SFF8020I, SCSI Transparent Command Set, Reduced Block Commands (RBC), T10 Project1240-D, ZIP disk and MO disk protocols.

11. A method of AutoRun using a semiconductor storage device, the semiconductor storage device being coupled with a host computer having an operation system with an AutoRun mechanism, comprising:
   1) the operation system of the host computer sending out a first inquiry command to the semiconductor storage device for detecting the type of the device, the semiconductor storage device including at least one device;
   2) the semiconductor storage device replying to the first inquiry command from the operation system that the device is an optical disk drive;
   3) the operation system of the host computer deeming the semiconductor storage device as an optical disk based on the reply from the semiconductor storage device, and performing an operation accordingly; and
   4) the AutoRun mechanism of the operation system searching for an AutoRun configuration file stored in the semiconductor storage device which simulates an optical disk drive so that a specific file directed by the AutoRun configuration file can be executed, the searching step comprising:
   (4-1) the operation system sending out a second inquiry command to detect whether an optical disk is inserted into the optical disk drive when the semiconductor storage device is deemed to be an optical disk drive;
   (4-2) in response to the second inquiry command, the semiconductor storage device, which simulates an optical disk drive, replying to the operation system after a predetermined delay, that an optical disk is already inserted into the optical disk drive so that the operation system can deem the semiconductor storage device as an optical disk with an optical disk; and (4-3) the AutoRun mechanism of the operation system searching for the AutoRun configuration file stored in the semiconductor storage device which simulates the optical disk drive with an optical disk so that the operation system can execute the specific file directed by the AutoRun configuration file, wherein an AutoRun program is preset in the semiconductor storage device coupled to the host computer for directing a specific file; and the AutoRun program is directed by the AutoRun configuration file, wherein the step (4-3) comprises:

the operation system accessing the AutoRun configuration file stored in the semiconductor storage device to search for the AutoRun program, and starting a timing program with a predetermined timing value, wherein the predetermined timing value is based on a size of the specific file, a time estimated for executing the AutoRun program, and performance of the semiconductor device; and executing the AutoRun program in the semiconductor storage device to search for the specific file, copying the AutoRun program in the semiconductor storage device and the specific file to be executed to a host disk of the host computer;

the AutoRun program in the semiconductor storage device calling the copy thereof in the host disk of the host computer to execute the copy of the specific file in the host disk of the host computer.

12. The method of claim 11, wherein the step (4-3) further comprises:
the copy of the AutoRun program sending out a reset command to the semiconductor storage device; and
if the AutoRun program cannot successfully send out the reset command, the timing program sending out a reset command to the semiconductor storage device when elapsed time reaches the predetermined timing value.

13. The method of claim 11, wherein the step (4-3) further comprises:
the timing program sending out a reset command to the semiconductor storage device when time reaches the predetermined timing value.

14. The method of claim 11, wherein the predetermined timing value is set by a user or through a special software and/or program.

15. The method of claim 11, further comprising the following steps for switching the semiconductor storage device to the conventional storage device after activating the AutoRun mechanism of the operation system in step 4), including:
5) resetting the semiconductor storage device;
6) replying that the semiconductor storage device is the conventional storage device when the operation system sends out the first inquiry command for detecting the type of the device;
7) the operation system of the host computer performing a configuration based on the reply from the semiconductor storage device; and
8) the operation system performing a conventional storage operation on the semiconductor storage device according to a user command.

16. The method of claim 15, wherein said steps for switching the semiconductor storage device to a conventional storage device can be performed after activating the AutoRun mechanism of the operation system, regardless of the execution of the specific file.

17. The method of claim 11, wherein the AutoRun mechanism of the operation system of the host computer supports an automatic execution of a file in the optical disk in the optical disk drive, and the optical disk drive is selected from the group consisting of a CD-ROM, a CD-RW, a DVD-ROM, a DVD-RW, a DVD-RAM, a blue laser DVD, and a red laser DVD.

18. The method of claim 11, wherein a device type of the semiconductor storage device can be changed by inputting an indication from a command, buttoning, or programming; the semiconductor storage device is then preset as a preset type selected from the predetermined types according to the input indication, and after the semiconductor storage device is reset, the semiconductor storage device is coupled to the host computer as the preset type of device.

19. The method of claim 11, wherein the host computer can perform a conventional storage operation on the semiconductor storage device according to a user command.

20. The method of claim 1, wherein the semiconductor device includes multiple devices, the operation system of the host computer sends out an inquiry commands to the multiple devices for detecting types of the devices, the multiple devices reply to the inquiry commands from the operation system based on one or more predetermined device types, the operation system of the host computer deems the multiple devices as one or more types of the predetermined device types according to the replies from the multiple devices and performs operations accordingly, and the AutoRun mechanism of the operation system searches for AutoRun configuration files stored in the multiple devices which simulate said deemed one or more device types so that specific files directed by the searched AutoRun configuration file can be executed by the operation system.

21. The method of claim 11, wherein the semiconductor device includes multiple devices, and the operation system of the host computer sends out first inquiry commands to the multiple devices for detecting the types of the devices, the multiple devices reply to the first inquiry commands from the operation system indicating which of the multiple devices are optical disk drives, the operation system of the host computer deems the multiple devices as optical disks based on the replies from the multiple devices and performs an operation accordingly, and the AutoRun mechanism of the operation system searches for AutoRun configuration files stored in the multiple devices which simulate an optical disk drive so that a specific files directed by the AutoRun configuration file can be executed.

* * * * *